UNITED STATES PATENT OFFICE.

JONATHAN SMITH AND CHARLES R. MESSINGER, OF TOLEDO, OHIO.

IMPOVEMENT IN DISTRIBUTING LIQUIDS THROUGH TOBACCO.

Specification forming part of Letters Patent No. 187,924, dated February 27, 1877; application filed September 27, 1876.

*To all whom it may concern:*

Be it known that we, JONATHAN SMITH and CHARLES R. MESSINGER, of Toledo, Ohio, have invented certain new and useful Improvements in the Treatment of Leaf-Tobacco, of which the following is a specification:

This invention relates to the treatment of tobacco in the leaf, or what is known as leaf-tobacco, before the same is manufactured or made up into prepared tobacco for chewing, smoking, and other purposes.

We treat the leaf-tobacco with glycerine or other ordinary or suitable materials used to moisten, sweeten, or flavor tobacco; and, to insure the speedy and even distribution of the liquid on or through the leaf-tobacco, we spray the same onto the tobacco, using for this purpose compressed air as the spraying agent.

Various forms of apparatus may be employed to carry out our invention. One form of apparatus is shown and described in our Letters Patent, No. 172,666, dated January 25, 1876, reissued June 27, 1876, No. 7,195.

In the present instance, however, there will not be needed any apparatus, such as described in said Letters Patent for separating the fine shorts from the long cuts.

We employ a compressed-air sprayer, such as specified in said Letters Patent; we also, as there specified, make use of an equalizing cylinder or fountain, which will hold a large volume of air, and supply to the spraying apparatus a jet of air which is steady, even, uniform, and without pulsation.

The leaf-tobacco may be fed toward the sprayer, or the sprayer may be moved toward or over the tobacco. As, for instance, the leaf-tobacco may be simply spread out on the floor, and the liquid material then sprayed upon it.

What we claim, and desire to secure by Letters Patent, is—

The described method of treating leaf-tobacco, which consists in distributing or spraying on or through said tobacco liquid moistening, sweetening, or flavoring material by means of compressed air, substantially in the manner set forth.

In witness whereof we have hereunto signed our names this 25th day of September, A. D. 1876.

JONA. SMITH.
CHAS. R. MESSINGER.

Witnesses:
M. BAILEY,
EWELL A. DICK.